Patented June 24, 1930

1,767,514

UNITED STATES PATENT OFFICE

GUSTAF DALÉN, OF STOCKHOLM, SWEDEN, ASSIGNOR TO AMERICAN GASACCUMULATOR COMPANY, OF ELIZABETH, NEW JERSEY, A CORPORATION OF NEW JERSEY

POROUS MASS FOR THE STORAGE OF EXPLOSIVE GASES AND METHOD OF MAKING SAME

No Drawing. Application filed May 14, 1925, Serial No. 30,362, and in Sweden May 27, 1924.

The present invention relates to improvements in porous masses for the storage of explosive gases, such as acetylene gas, and in the method of making said masses.

The general object of the invention is to provide a porous mass of novel construction which may be relied upon for the storage of explosive gases with safety.

It is also an object of the invention to provide a novel method by the employment of which such porous masses of improved construction may be economically made or manufactured.

The mass embodying the invention consists, broadly speaking, of lumps formed of porous material bound together by means of a suitable binding agent or cement, such, for example, as good Portland or hydraulic cement, a cement consisting of a mixture of zinc oxid and zinc chloride, etc., the voids between which are filled with a porous fibrous material or with a powdered or granular material.

As indicated, the lumps may be formed of fibrous material, such as asbestos, cellulose, silk, or other suitable fibrous material, bound together by a suitable binding agent; or the lumps may consist of powdered or granular material, such as kieselguhr, brick dust (burnt clay), pumice stone, or other suitable similar material, bound together by a suitable binding agent or cement.

If the lumps are formed of porous material of the character last referred to they may be strengthened by mixing a suitable fibrous material, such as asbestos fiber, with the material of which they are formed, during the formation thereof.

The amount of fibrous material employed should be such as to render the lumps sufficiently resistant to breakage and crumbling after having been packed in storage tanks or receivers for use.

The lumps having been formed are packed into a tank or receiver of the usual type and character with sufficient porous material intermingled or mixed therewith to completely fill the interstices or voids between the lumps. The filling material between the lumps may consist of a suitable porous fibrous material, or it may consist of powdered or granular kieselguhr, brick dust (burnt clay), pumice stone, or other analogous materials.

These lumps may be of varying sizes and of irregular shape or regular shape. The shape of the lumps is immaterial.

One porous material which may be employed in the manufacture of porous masses for the storage of explosive gases, such as acetylene gas, is kieselguhr in powdered form. In the employment of kieselguhr in granular or powdered form it is mixed with an adhesive, such as good Portland or hydraulic cement, zinc-oxy-chloride cement, or any other good cement which is suitable for the purpose.

In the manufacture of the lumps above referred to from granular or powdered kieselguhr, the latter, together with a suitable amount of good cement for properly binding the same together and sufficient water to produce a pasty mass, are placed in a suitable mechanical mixing apparatus and are thoroughly mixed together therein. The mixing is carried on until the mass has stiffened. The said apparatus should be of a character to effect breaking of the mass into an indefinite number of lumps or irregular shapes and sizes.

If preferred, a sufficient amount of fibrous material, such as asbestos fiber, may be included in the mixture to produce lumps of increased strength which are able to offer greater resistance to breakage or disintegration either before or after they have been packed into a tank or receiver than otherwise would be the case.

The lumps having been formed they are, as previously indicated, packed into the said tanks or receivers with sufficient powdered or granular material, such as kieselguhr, to completely fill the voids or interstices between the same. Preferably, the lumps are mixed with the granular or powdered material before placing the same in the tanks, and the quantity of granular or powdered material should be so proportioned to the lumps that when packed into the tanks or receivers it prevents the mass from sinking or altering in shape during transport, or after the same shall have been in use for a period of time.

The necessary amount of granular or powdered kieselguhr, or other material, depends upon the form and size of the lumps and may be ascertained by experiment.

The foregoing description of the manufacture of the mass by the use of a specified porous material is given by way of example and it is to be understood that other porous materials suitable for use in the manufacture of porous masses for the purpose stated may be employed and treated in like manner for the formation of lumps or pieces. Whatever material may be employed for the manufacture of the lumps, the interstices or voids between the same must be completely filled, as above described, when they are packed within the tank or receiver, because it is essential that the mass within the receiver shall be continuous or solid and that no voids or cracks shall be present therein.

Instead of producing or making the lumps in the manner as above described the respective lumps may include a core of a porous material surrounded by a coating of greater or less thickness of material of the character indicated. That is to say, the layer of material about a core may consist of fibrous material, such as asbestos, cellulose, silk or the like, bound together by a suitable cement, or such coating may consist of porous material, such as granular or powdered kieselguhr, brick dust (burnt clay), pumice stone, or other like suitable material, either with or without an admixture of fibrous material, bound or bonded together by a suitable cement. As a suitable material for the core pieces may be mentioned charcoal which possesses certain desirable properties, such, for example, as the requisite or necessary porosity. Charcoal is not satisfactory, however, when used alone as a filling mass for explosive gas storage tanks or receivers, because of its brittle or frangible character.

In the manufacture of lumps including pieces of charcoal as cores, the charcoal in pieces of desired or suitable size, together with a porous fibrous material or porous powdered material of the character above indicated, water, and a suitable cement or binding agent are placed in a mixing apparatus and thoroughly mixed together. In the operation of mixing the same the porous fibrous material or the porous powdered material, as the case may be, forms a coating of greater or less thickness around the charcoal pieces, so that lumps are produced comprising charcoal incased in a coating of porous material. The charcoal previous to being mixed with the porous materials which may be employed should be wet with water, so that when placed in the mixture its pores may contain water therein.

The lumps consisting of charcoal with a coating of the character indicated may then be packed into tanks or receivers with a suitable filling material mixed therewith to completely fill the voids or interstices between the same, as above described, in connection with the lumps made of kieselguhr or other material. The powdered material or fibrous material, whichever may be employed, may be mixed with the charcoal covered lumps prior to placing the same within the tanks or receivers.

If preferred, the core pieces, whether they consist of charcoal or some other suitable material, may be placed in a rotating drum, or the like, and subjected to a polishing process before the wetting thereof with water and the mixing of the same with the porous fibrous or porous powdered material of the character and in the manner as above described.

It is preferred that the lumps shall be of a size such that in admixture with the porous material for filling the voids or interstices between the same in the mass they may be introduced into the tank or receiver through the usual opening or outlet with which such tanks or receivers are provided.

It will be understood that the mixture of lumps and porous fibrous or porous powdered material, as the case may be, is closely packed into the tanks or receivers, and that after having been so packed therein it is dried so as to remove the moisture completely therefrom.

The gas to be stored within tanks filled with the mass embodying my invention usually will be dissolved in a suitable solvent. The solvent usually employed for dissolving acetylene gas consists of acetone. However, the mass may be employed for the storage of gases in a free state; that is, undissolved in a solvent.

It will be seen that by my invention I have provided not only a new method by which a porous mass adapted for the storage of explosive gases may be made or produced but I have also provided a novel mass which is efficient for the storage of gases and by the employment of which the liability to explosion is eliminated.

The term "cement" employed herein is used in a descriptive sense and not as a limitation and is intended to include any substance suitable for use as a binding agent.

Having thus described my invention, what I claim and desire to secure by Letters Patent is:

1. A porous mass within a tank or receiver for the storage of explosive gases, consisting of lumps, each of which comprises a core of solid material incased in a coating of porous composite material, and porous material in the form of finely divided particles completely filling the voids between the said lumps.

2. The method of producing a porous mass for the storage of gases, comprising the mixing together of lumps of porous material, a porous material of finely divided particles, cement and water, and agitating the mixture to cause the said finely divided porous material and cement to form a coating around the said lumps, and thereafter mixing the composite lumps thus formed with finely divided particles of porous material in sufficient quantity to completely fill the voids between the said lumps, and thereafter packing the mixture into a tank or receiver.

3. A porous mass within a tank or receiver for the storage of explosive gases consisting of lumps each of which comprises a core of solid material incased in a coating of porous material, and porous material in the form of finely divided particles completely filling the voids between said lumps.

4. A porous mass within a tank or receiver for the storage of explosive gases, consisting of lumps, each of which comprises a lump of charcoal as a core incased within a coating formed of finely divided porous material bound together and about the said core by a suitable cement, and porous finely divided material completely filling the voids between the said lumps.

In testimony that I claim the foregoing as my invention, I have hereunto signed my name this 16th day of April, A. D. 1925.

GUSTAF DALÉN.